(12) United States Patent
Freymann et al.

(10) Patent No.: US 7,203,321 B1
(45) Date of Patent: Apr. 10, 2007

(54) DEVICE FOR ELECTROACOUSTIC SOUND GENERATION IN A MOTOR VEHICLE

(75) Inventors: Raymond Freymann, München (DE); Helmut Spannheimer, Neukeferloh (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 970 days.

(21) Appl. No.: 09/666,300

(22) Filed: Sep. 21, 2000

(30) Foreign Application Priority Data

Sep. 21, 1999 (DE) ............................. 199 45 259

(51) Int. Cl.
*H03G 3/00* (2006.01)

(52) U.S. Cl. .......................... 381/61; 381/86
(58) Field of Classification Search ............... 381/71.2, 381/71.9, 61, 94.2, 86, 71.4
See application file for complete search history.

(56) References Cited

U.S. PATENT DOCUMENTS

| | | | |
|---|---|---|---|
| 4,354,415 A * | 10/1982 | Sonnabend | 84/706 |
| 5,237,617 A * | 8/1993 | Miller | 381/61 |
| 5,371,802 A | 12/1994 | McDonald et al. | |
| 5,485,523 A * | 1/1996 | Tamamura et al. | 381/71.4 |
| 5,635,903 A | 6/1997 | Koike et al. | |
| 5,692,052 A * | 11/1997 | Tanaka et al. | 381/71.9 |
| 5,835,605 A * | 11/1998 | Kunimoto | 381/61 |
| 6,275,590 B1 * | 8/2001 | Prus | 381/61 |
| 6,356,185 B1 * | 3/2002 | Plugge et al. | 340/384.3 |

FOREIGN PATENT DOCUMENTS

| | | |
|---|---|---|
| DE | 2734948 A1 | 2/1979 |
| DE | 4233252 C1 | 12/1993 |
| DE | 4435296 A1 | 4/1996 |
| DE | 19845736 A1 | 4/2000 |
| EP | 0469023 B2 | 2/1992 |
| EP | 625773 A2 | 11/1994 |
| WO | WO 91/18385 * | 11/1991 |

OTHER PUBLICATIONS

Opposition in a proceeding with the German Patent Office re German Patent Application No. DE 199 45 259.8-53 (German language original with English translation).

* cited by examiner

*Primary Examiner*—Xu Mei
(74) *Attorney, Agent, or Firm*—Crowell & Moring LLP

(57) ABSTRACT

A device for electroacoustic sound generation in a motor vehicle with a sound pressure sensor, a signal processing unit, which is connected with the sound pressure sensor and receives and processes signals therefrom, and a loudspeaker unit with at least one loudspeaker connected with the signal processing unit. The sound pressure sensor is arranged in the area of the intake tract or exhaust gas tract of the motor vehicle. To ensure a sound generation that is as variable as possible and nevertheless authentic, a synthesizer that is connected with, or integrated in, the signal processing unit is used so that synthetic sound components can be added to the signals generated from the sound pressure sensor.

9 Claims, 1 Drawing Sheet

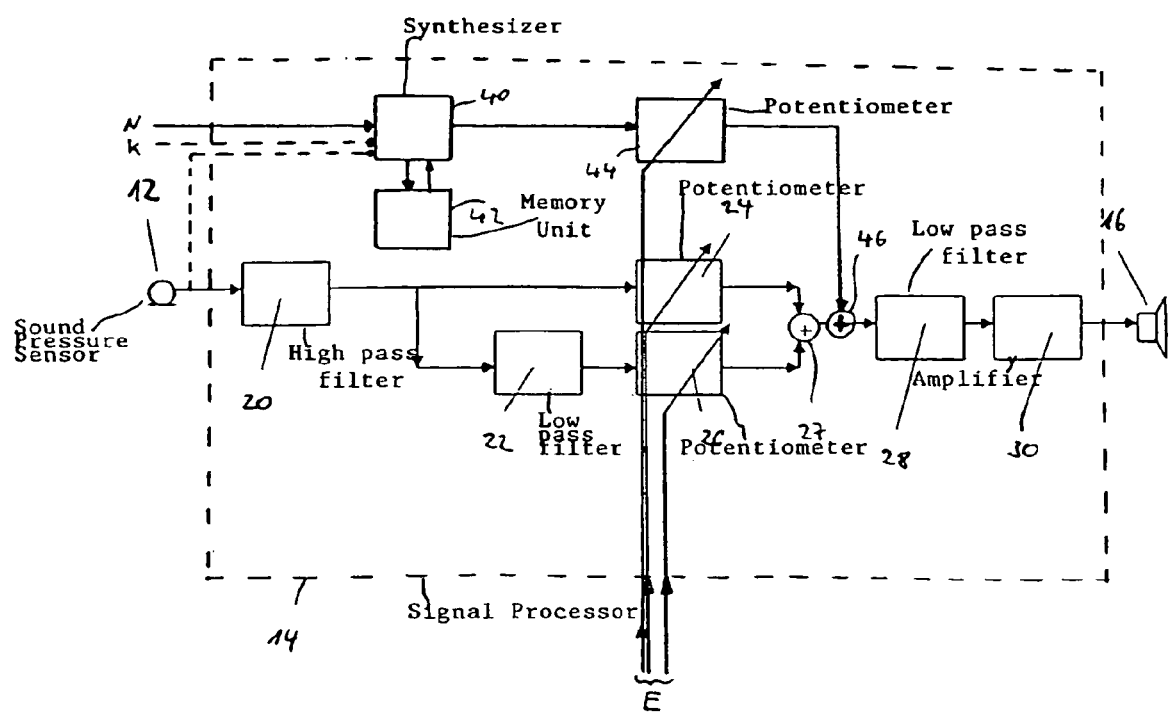

DEVICE FOR ELECTROACOUSTIC SOUND GENERATION IN A MOTOR VEHICLE

BACKGROUND AND SUMMARY OF THE INVENTION

This application claims the priority of German application 19945259.8, filed Sep. 21, 1999, the disclosure of which is expressly incorporated by reference herein.

The invention relates to a device for electroacoustic sound generation in a motor vehicle.

The control of sound is a vehicle component is based on the principle that the vehicle occupants should be offered a high measure of acoustic comfort, with particular value being attached to a low noise level. On the other hand, the driver should also be able to exactly recognize the operating state of the engine. For this purpose, feedback of the driving sound, particularly feedback of the engine sound, is advantageous. In other respects, emission regulations (including noise emission regulations) must be met.

To resolve these conflicting aims it is known in the art to modify the noise in the passenger compartment by passive adjustment measures, e.g., by aggregate bearings.

Furthermore, in addition to good sound insulation, the synthetic generation of passenger compartment sounds, or the storing of sound components and electroacoustic playing into the passenger compartment, are also known in the art (cf. European Patent EP 0 469 023 B1, German reference DE 27 34 948 A1).

The exhaust system and the intake tract are sources which have strong load dependency. However, a general increase in the sound emitted by these excitation sources is not an appropriate solution due to the aforementioned emission and external noise regulations. Additionally, the introduction of these sound components into the compartment is largely inhibited by high body insulation, which is necessary to reduce wind and rolling sounds and to suppress interfering mechanical engine sound components. Although a deliberate mechanical introduction into the passenger compartment is possible in principle and known in the art (German references DE 44 35 296 A1, and DE 42 33 252 C1), it has proven to be disadvantageous with respect to costs and arrangement within the vehicle.

A purely synthetic production of an engine sound has also proven to be disadvantageous since, as a rule, it does not give the perception of an absolutely authentic engine sound.

German Patent DE 198 45 736 A1 therefore proposes to detect the sound pressure in the intake or exhaust tract of an internal combustion engine, to process it and to introduce the signals thus generated into the passenger compartment. The intake and exhaust tracts are acoustic sources that are particularly load-dependent. Even very simple embodiments can thus convey relatively faithful acoustic signals to the passenger compartment. Using filtering elements in a signal processing unit of the above-described device allows for variation in the sound characteristic. There are limits, however, with respect to this ability to modify the sound composition. For example, those frequency spectrums that are not contained in the signals supplied by the sound pressure sensor cannot be generated.

Thus, the object of the present invention is to improve an initially described device for electroacoustic sound generation in such a way as to ensure a sound generation that is as variable as possible but nevertheless authentic.

Accordingly, a synthesizer is added to a device such as the one disclosed by DE 198 45 736 A1. This synthesizer artificially produces signals or sounds and adds these sound components to the signals generated from the sound pressures. This makes it possible to introduce sounds into the passenger compartment with frequencies that do not occur in the intake or exhaust tracts.

To produce a particularly authentic engine sound, it was found to be advantageous to generate sinusoidal frequencies that can be traced to the rotational frequencies of the driving engine. In particular, one or several sinusoidal frequencies corresponding, for example, to a half-integral and/or integral multiple of the engine speed can be generated.

Adding synthesized sound components to the sounds that are generated via the sound pressure sensor makes it possible to produce an overall impression that is desirable from the perspective of a sound designer and still sounds authentic.

In one embodiment amplitudes and phases of sinusoidal frequencies are first stored. These amplitudes and phases are added in a table as a function of the rotational speed of the driving engine. Depending on the engine speed, the corresponding amplitude and phase values can be read out of the table, and the synthesizer can generate signals as a function thereof. This makes it possible to achieve a sound characteristic that is adapted to the speed. Of course, the amplitude ratio of the various pure tones decisively determines the overall sound characteristic. The amplitude of the signals to be played by the synthesizer can also be influenced by, for example, the throttle position, the accelerator pedal position, or other load signals. Particularly by taking into account signals that are coupled to a load, it is possible to achieve load-dependency of the generated sound as well.

According to an alternative embodiment, the signal from the sound pressure sensor itself can serve as the input variable for the synthesizer. This input signal is also load-dependent in a particular manner.

If a certain sound characteristic is to be achieved as a function of different vehicle operating conditions, the amplitude and/or phase ratios of the individual sounds must be modified. In addition to control via the throttle position, the accelerator pedal, the rotational speed of the driving engine, and the vehicle speed, other parameters, such as the kickdown position, gear selection or, for example, a signal indicating whether the convertible top is open or closed can be used to determine the amplitude and/or phase ratios. Several tables can be provided from which values can be selected as a function of these or other vehicle parameters.

In a particularly advantageous embodiment, a vehicle thrust is detected and a matching sound is created. For example, during the transition to a thrusting operation, a slowly surging sound can be produced. It is also possible to produce a stochastic noise during the detected thrust (putt-putting, muttering) and play. To this end a unit to detect push operation must be provided. Depending on the evaluation signal, a characteristic acoustic pattern must then be selected for this push operation and a signal must be supplied to the synthesizer. The synthesizer then produces a desired sound in push operation.

Overall, the present invention provides a further improvement of the sound in a passenger compartment, particularly in view of the variability with respect to different vehicle operating conditions.

Other objects, advantages and novel features of the present invention will become apparent from the following detailed description of the invention when considered in conjunction with the accompanying drawings.

BRIEF DESCRIPTION OF THE DRAWINGS

The single FIGURE is a sketched schematic diagram of an exemplary embodiment of the device according to the invention.

DETAILED DESCRIPTION OF THE PREFERRED EMBODIMENT

In an intake tract of a motor (not depicted), a sound pressure sensor 12 is provided, which detects the changes in air pressure produced by the vehicle dynamics and supplies them to a signal processing unit 14. Alternatively, the sound pressure sensor can also be arranged in the exhaust tract, or near the intake or exhaust tract, e.g. in the area of the intake tract inlet or the exhaust tract outlet.

The signal processing unit 14 processes, among other things, the signals from sound pressure sensor 12 and supplies them to a loudspeaker unit 16 that transforms the signals generated by signal processing unit 14 into acoustic signals and plays them into the passenger compartment. The loudspeakers used can be separate loudspeakers or the loudspeakers of an already existing audio or communications system of a vehicle.

Signal processing unit 14 in the present case essentially comprises two branches. On the one hand, the signal originating from sound pressure sensor 12 is processed in a filter unit 20, 22, 24, 26, which will be further described below, and, after corresponding amplification, is supplied to loudspeaker unit 16. In a second branch, signals corresponding to sound components are synthesized and added to the signals originating from sound pressure sensor 12. This procedure makes it possible to produce an authentically sounding passenger compartment sound that can be varied in any manner over a wide range.

In the first branch, the signal from sound pressure sensor 12 is first sent through a high-pass filter 20 to eliminate low frequency sound components that would result in excessive membrane movements. The signal supplied by high-pass filter 20 is split into two paths. In one path, the signal is guided through a low-pass filter 22 and then to a potentiometer 26 which, depending on its adjustment, supplies a more or less attenuated signal to an adder 27. The adjustment of the potentiometer is determined via input variable E, which will be further explained below. Of course, other embodiments can use other filter arrangements in the different branches.

The signal in the other path of the first branch goes directly to a further potentiometer 24 and thus has broadband components. After potentiometer 24, this signal is also supplied to adder 27. The two signals coming from potentiometers 24 and 26 are brought together and added in the adder 27 (mixed).

In the second branch, the synthetic branch, a synthesizer 40 is provided, which is designed to produce sinusoidal frequencies. Synthesizer 40 in the present embodiment has an input to which the rotational speed signal N of the driving engine is supplied. As a function of this rotational speed signal N, synthesizer 40 produces several pure tones, the frequencies of which correspond to half-integral and integral multiples of the engine speed. The amplitudes and phases of the respective sinusoidal frequencies depend on the engine speed and are read out of a memory unit 42. For this purpose, synthesizer 40 supplies the rotational speed signal to memory unit 42. Memory unit 42 has at least one table in which the amplitudes and phases are stored as a function of the engine speed. Based on the quantities read out of the table and memory unit 42, synthesizer 40 generates a signal with a certain sound characteristic. Of course, the amplitude ratio, the phase position and the number of pure tones determine this sound characteristic. The signal generated by synthesizer 40 is supplied to a further potentiometer 44, which defines the signal intensity.

The signal for synthetic sound generation is added by adder 46 to the signal from the sound generation via the sound pressure sensor. The overall mixture, in the present case, is determined by the adjustment of potentiometers 24, 26, 44.

The total signal is subsequently guided through a further low-pass filter 28 so that the frequencies are upwardly limited.

Alternatively, the signal of each path can be guided through a low-pass filter of its own and be mixed in an adder positioned after these low-pass filters. At this location of the arrangement it is furthermore possible to provide an equalizer filter with which the transmission behavior of the loudspeaker or the passenger compartment can be influenced.

Finally, the signal thus processed is amplified in an amplifier 30 and supplied to loudspeaker unit 16 of the vehicle. The loudspeaker unit transforms the electric signal into an acoustic signal. This results in a signal in the passenger compartment, which is very authentic but varied in the desired manner.

In the present case, potentiometers 24, 26 and 44 are manually adjusted. By a change in the corresponding potentiometers, the weighting of the respective paths can be changed between a broadband and low-band component of the signal coming from the sound pressure sensor on the one hand and the synthetic signal on the other hand. The setting of the potentiometers can also be fixed.

Alternatively, the potentiometers can be electronically controlled and can depend on the vehicle operating conditions. The figure shows corresponding signal inputs E by which this adjustment can be made. For example, potentiometers 24, 26 and 44 can be adjusted as a function of the throttle position, the rotational speed signal of the driving engine, or the speed. For this purpose, signal processing unit 14 can be connected to a CAN bus and be provided with an additional control unit which controls potentiometers 24, 26 and 44.

In a further alternative embodiment—indicated by the dashed line representing the input variables of synthesizer 40—other vehicle operating parameters can be used to generate and/or control the synthetic signal. For example, the number of pure tones, the decision whether half-integral and integral multiples of the engine speed frequencies are used, and the amplitude and phase ratios can be made a function of input variables, such as throttle position, accelerator pedal position, vehicle speed and engine speed. Among the input variables K, other parameters, such as kickdown position, gear selection, or a signal indicating whether the convertible top is opened or closed, can also be read in. Overall, the same parameters can be used for both input variables E and K. Depending on the embodiment of the synthesizer and the consideration of different input parameters, it is possible to achieve specially adapted, dynamic sound impressions. It is also possible to store several tables in memory unit 42, which are read out as a function of the input parameters. The sound to be played into the passenger compartment can thus be varied over a wide range, without excessively deviating from the authenticity of the sound from the intake area.

Taking into account the signal from the sound pressure sensor in synthesizer 40 (see the corresponding dashed line in the drawing) has proven to be particularly advantageous. By controlling the sound characteristic and the dynamics via the signal from sound pressure sensor 12, a special change with respect to load dependency can be achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for electroacoustic sound generation in a motor vehicle, said device comprising:
   a sound pressure sensor positioned proximal to or within one of an intake tract and an exhaust tract of the motor vehicle;
   a signal processing unit connected to and receives an output of said sound pressure sensor;
   a loudspeaker unit having at least one loud speaker wherein said loudspeaker unit is connected to said signal processing unit;
   a synthesizer connected with or integral with said signal processing unit said synthesizer outputting a synthetic sound components signal to a device for adding said synthesizer output signal to said output of said sound pressure sensor.

2. The device according to claim 1, wherein said synthesizer provides at least one sinusoidal frequency that is a function of an engine speed of said motor vehicle.

3. The device according to claim 2, further including a memory unit containing values for at least one of amplitudes and phases of sinusoidal oscillations as a function of the engine speed.

4. The device according to claim 1, wherein said synthesizer includes at least one input for input signals indicating at least one of throttle positions, accelerator pedal position and input parameters of corresponding signals and wherein at least one of the amplitude and sound characteristics of signals generated by the synthesizer are variable as a function of said input signals.

5. The device according to claim 1, wherein said synthesizer is connected to receive an input signal as a function of the detected sound pressure amplitude and wherein at least one of the amplitude and sound characteristic of the signal output by said synthesizer is varied as a function of said input signal.

6. The device according to claim 1, wherein said synthesizer outputs a predefined sound in response to an indication of a thrust operation of said motor vehicle.

7. The device according to claim 1, wherein said signal processing unit includes a filter unit for filtering a signal from said sound pressure sensor and wherein said filter provides an output which changes the sound characteristics of sound detected by said sound pressure sensor.

8. A device for electroacoustic sound generation in a motor vehicle, said device comprising:
   a sound pressure sensor positioned proximal to or within one of an intake tract and an exhaust tract of the motor vehicle;
   a signal processing unit;
   a loudspeaker unit having at least one loud speaker wherein said loudspeaker unit is connected to said signal processing unit;
   a synthesizer, that outputs synthetic sound components, connected with or integral with said signal processing unit, whereby the synthetic sound components are added to said signal generated from said sound pressure sensor;
   wherein said signal processing unit includes a means for mixing the sound from said sound pressure sensor and from said synthesizer as a function of operational parameters of said motor vehicle.

9. An electroacoustic sound generator for a motor vehicle comprising:
   a sound pressure sensor positioned in the vicinity of or within the intake tract or the exhaust tract of the motor vehicle;
   a signal processing unit including a first input for receiving an output of said sound pressure sensor and a second input for receiving a rotational speed signal from said motor vehicle, said signal processing unit comprising a synthesizer including said first input for receiving said output of said sound pressure sensor for outputting synthetic sound components signals and said signal processing unit further including a device for adding said synthetic output sound components signals to output signals generated from said sound pressure sensor; and
   a loudspeaker system connected with an output of said signal processing unit.

\* \* \* \* \*